(12) United States Patent
Strong et al.

(10) Patent No.: US 12,219,380 B1
(45) Date of Patent: *Feb. 4, 2025

(54) MESH PATH SELECTION BASED ON END-TO-END THROUGHPUT

(71) Applicant: Amazon Technologies, Inc., Seattle, WA (US)

(72) Inventors: Jasmine Strong, San Francisco, CA (US); Bharat Kumar Mandarapu, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,407

(22) Filed: Nov. 6, 2023

Related U.S. Application Data

(63) Continuation of application No. 18/127,407, filed on Mar. 28, 2023, now Pat. No. 11,889,339.

(60) Provisional application No. 63/441,382, filed on Jan. 26, 2023.

(51) Int. Cl.
*H04W 24/10* (2009.01)
*H04L 43/0888* (2022.01)
*H04W 84/18* (2009.01)

(52) U.S. Cl.
CPC ......... *H04W 24/10* (2013.01); *H04L 43/0888* (2013.01); *H04W 84/18* (2013.01)

(58) Field of Classification Search
CPC .... H04W 24/10; H04W 84/18; H04L 43/0888
See application file for complete search history.

(56) References Cited

U.S. PATENT DOCUMENTS

| | | | |
|---|---|---|---|
| 10,129,158 B2* | 11/2018 | Garg | H04L 45/22 |
| 10,362,526 B2* | 7/2019 | Gokturk | H04L 43/12 |
| 10,993,164 B1* | 4/2021 | Shukla | H04W 40/22 |
| 11,570,686 B2* | 1/2023 | Gokturk | H04W 40/12 |
| 2016/0308755 A1* | 10/2016 | Garg | H04W 28/0289 |
| 2019/0364483 A1* | 11/2019 | Gokturk | H04W 40/12 |
| 2020/0259737 A1* | 8/2020 | Koshy | H04W 28/0883 |

OTHER PUBLICATIONS

Ladas et al, "Multipath routing approach to enhance resiliency and scalability in ad-hoc networks", 2016 IEEE International Conference on Communications (ICC), Jul. 2016.*

(Continued)

*Primary Examiner* — Todd L Barker
(74) *Attorney, Agent, or Firm* — Lowenstein Sandler LLP

(57) ABSTRACT

Technologies for mesh path selection are described. One method of operating a first wireless mesh device includes determining, using first client information about a first link, the first link using a first frequency range, a first metric representing airtime usage on the link, and a second metric representing a first amount of data on a second link, the second link using the first frequency range. The method determines a third metric on a third link, the third link using a second frequency range. The method determines, using the metrics, a first throughput associated with a first path with the second link and a second throughput associated with a second path. The method determines that the third link results in better throughput and sends or receives first data on the third link.

20 Claims, 8 Drawing Sheets

(56) References Cited

OTHER PUBLICATIONS

Javaid et al., "Investigating quality routing lik metrics in Wireless Multi-hop Networks", Annals of Telecommunications, Dec. 0, 2013.*

Yi et al., "Multipath optimized link state routing for mobile ad hoc networks", Ad Hoc Networks, Jan. 2011.*

Ghannay S., et al., "Multi-Radio Multi-Channel Routing Metrics in IEEE 802.11s based Wireless Mesh Network—And the Winner Is . . . ", First international Conference on Communications and Networking, Nov. 3, 2009, 8 Pages.

Guerin J., et al., "Routing Metrics for Multi-Radio Wireless Mesh Networks", Australasian Telecommunication Networks and Applications Conference, Dec. 2, 2007, pp. 343-348.

Jang K Y., et al., "Simple Yet Efficient, Transparent Airtime Allocation for TCP in Wireless Mesh Networks," Co-NEXT '10: Proceedings of the 6th International Conference, Nov. 2010, 12 Pages.

* cited by examiner

MESH PATH SELECTION BASED ON END-TO-END THROUGHPUT

RELATED APPLICATION

This application is a continuation of U.S. patent application Ser. No. 18/127,407, filed Mar. 28, 2023, which claims the benefit of U.S. Provisional Application No. 63/441,382, filed Jan. 26, 2023, the entire contents of which are hereby incorporated by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies for mesh path selection are described. Traditional mesh-link based path algorithms can be executed independently by a wireless client device (also referred to herein as a wireless endpoint device), and a mesh node. For example, the client device can be connected to a leaf mesh node of a wireless mesh network over an access point-to-client (AP-client) link. The leaf node can be connected to a gateway over a mesh link with or without intervening nodes. The client device usually only has one radio, and the leaf node can have multiple radios. The leaf node can be constantly connected on all these radios to other neighboring nodes but cannot control which channel the client uses to connect to it. Both the leaf node and the client device can independently select the best channel to use; the client device can select the best channel to communicate with the leaf node, and the leaf node can select the best channel to communicate with the gateway or other mesh node. Sometimes, the leaf node and the client can select the same channel. For example, the client's physical bitrate on the channel can remain at a higher Modulation and Coding Scheme (MSC) even when connected to the same channel used by the leaf node. However, when the leaf node and the client device use the same channel, the maximum throughput seen by the client device is cut in half of the radio capability. In particular, the airtime is divided between the two radios, so the maximum throughput drops to half. Traditional mesh path selection algorithms do not consider the airtime needed to be consumed for an AP-client transmission.

Aspects and embodiments of the present disclosure address the above and other deficiencies by providing a selection algorithm that selects, for client data traffic of on mesh link, an alternative channel (or band) other than a channel used by the client device if the alternate channel provides better throughput. Aspects and embodiments of the present disclosure can determine if the alternative channel improves end-to-end throughput based on a channel condition and transmission rate between a leaf node and the client device on the AP-client link. Aspects and embodiments of the present disclosure can improve end-to-end client throughput in a multi-radio mesh system. Aspects and embodiments of the present disclosure can provide maximum performance support for a wireless client in a multi-band mesh network. Aspects and embodiments of the present disclosure can provide an end-to-end peak performance enhancement. Aspects and embodiments of the present disclosure can ensure mesh link data traffic does not switch with its self-traffic load variation. Aspects and embodiments of the present disclosure can provide multi-band usage for mesh transmission based on client traffic. Aspects and embodiments of the present disclosure can improve the correctness of airtime mesh metric evaluations.

Figure 1:
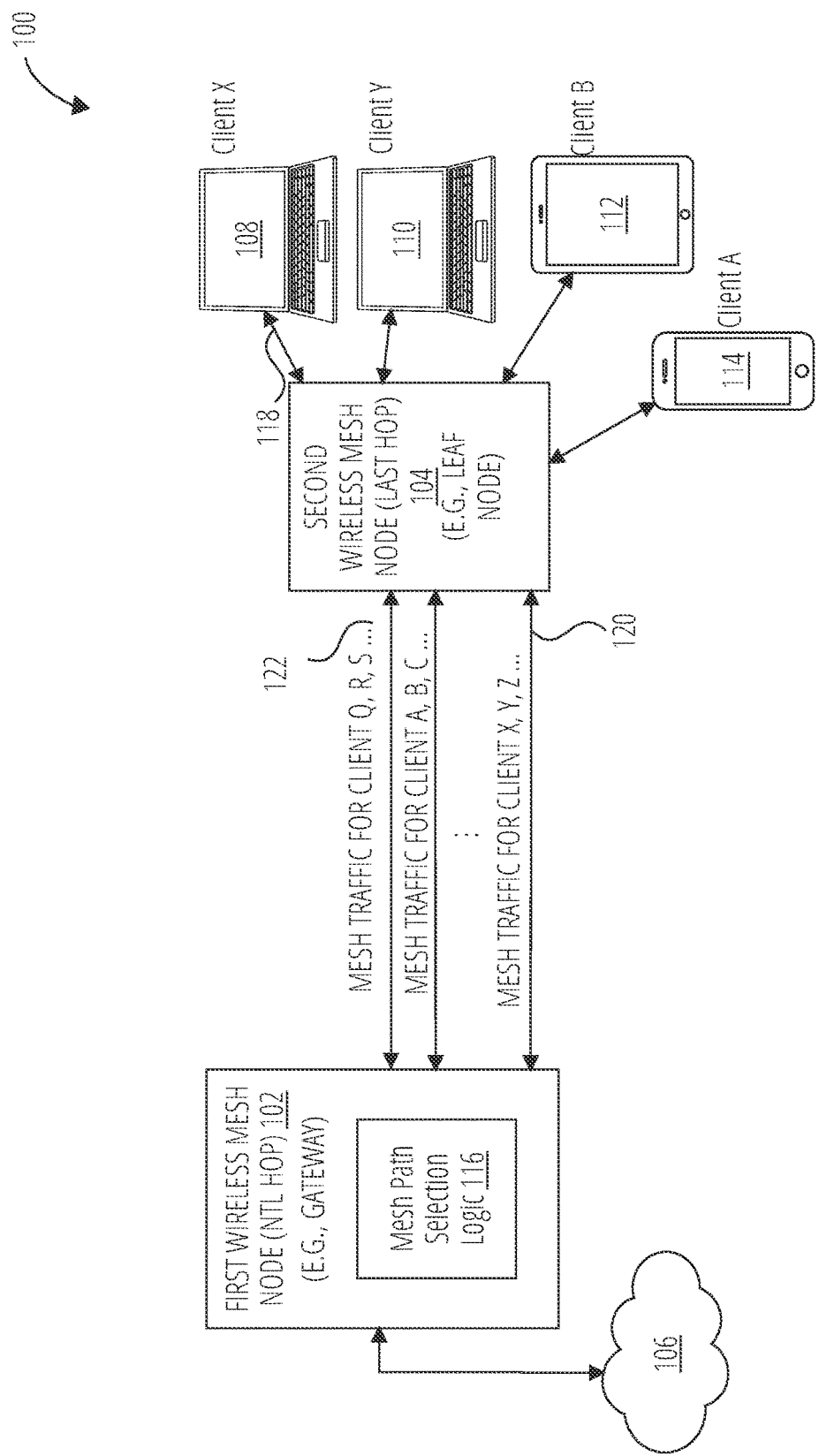
FIG. 1 is a block diagram of a wireless mesh network with a first wireless mesh node 102 with mesh path selection logic 116 for selecting a mesh link for client data traffic according to at least one embodiment.

FIG. 1 is a block diagram of a wireless mesh network 100 with a first wireless mesh node 102 with mesh path selection logic 116 for selecting a mesh link for client data traffic according to at least one embodiment. A "mesh node" (also referred to herein as mesh device" is a wireless device that is configured to operate as a mesh node in a mesh network. The first wireless mesh node 102 can include a multi-band radio, a processor, and a memory to store computer-executable instructions that, if executed, cause the processor to perform various operations described herein. In at least one embodiment, the first wireless mesh node 102 can be a next-to-last-hop (NTLH) node. The NTLH node can be coupled to a last hop (LH) node, also referred to as a leaf node. In at least one embodiment, the NTLH node can be a gateway device of the wireless mesh network 100. In another embodiment, the NTLH node can have one or more intervening nodes between it and the gateway device. The LH node is a node to which one or more client devices connect. In some embodiments, the NTLH node can also service client devices. That is, client devices can connect to the NTLH node. With respect to these devices, the NTLH node would be a last hop node.

In at least one embodiment, the first wireless mesh node 102 can receive, from a second wireless mesh node 104, client information associated with one or more client devices, such as first wireless client devices 108, 110, 112, and 114, which are connected to the second wireless mesh node 104. The client information can include first client information associated with the first wireless client device 108, which is connected to the second wireless mesh node 104 over a first AP-client link 118. The first wireless client device 108 and second wireless mesh node 104 can communicate data over the first wireless client device 108 using a first frequency band. The first wireless mesh node 102 can determine, using the first client information, a first metric representing airtime usage associated with the first AP-client link 118. The first wireless mesh node 102 can determine a second metric representing a first amount of mesh traffic associated with the first wireless mesh node 102 on a first mesh link 120 between the first wireless mesh node 102 and the second wireless mesh node 104. The second wireless mesh node 104 and first wireless mesh node 102 can communicate data over the first mesh link 120 using the same first frequency band. The first wireless mesh node 102 can determine a third metric representing the first amount of mesh traffic associated with the first wireless client device 108 on a second mesh link 122 between the first wireless mesh node 102 and the second wireless mesh node 104. The second wireless mesh node 104 can communicate data on the second mesh link 122 using a second frequency band different from the first frequency band. The first wireless mesh node 102 can determine, using the first metric and the second metric, a fourth metric representing a first amount of throughput associated with a first path comprising the first mesh link 120 and the first AP-client link 118. The fourth metric can be an end-to-end throughput metric. The first wireless mesh node 102 can determine a fifth metric representing a second amount of throughput associated with a second path comprising the second mesh link 122 and the first AP-client link 118. The first wireless mesh node 102 can determine that the fifth metric is less than the fourth metric. The first wireless mesh node 102 can send or receive first mesh traffic associated with the first wireless client device 108 on the second mesh link 122. In the event that the fifth metric is not less than the fourth metric, the first wireless mesh node 102 can send or receive first mesh traffic associated with the first wireless client device 108 on the first mesh link 120.

In at least one embodiment, the first wireless mesh node 102 can determine which path has the best end-to-end client throughput. In at least one embodiment, the first wireless mesh node 102 can determine which frequency band to use or which channel to use. The first wireless mesh node 102 can improve end-to-end client throughput by selecting a mesh link for the client traffic on a different channel or band other than the channel client is connected if, moving to it, provides better throughput. It should be noted that client-based best path selection should not change depending on the client's traffic load. The first wireless mesh node 102 and second wireless mesh node 104 can be configured to update a data store with each neighbor node's channel frequency, channel load, client bitrate, etc. The first wireless mesh node 102 can calculate an AP-client link metric and a channel load for its own data traffic. In at least one embodiment, the operations described herein are performed by mesh path selection logic 116. The mesh path selection logic 116 can be processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The mesh path selection logic 116 can calculate an effective end-to-end metric when both an AP-client link and a mesh link are on the same channel, compared with other channels' mesh metrics to find the best path. The neighbor node client statistics can be collected and stored for debugging and validation. The mesh path selection logic 116 can correct a mesh link metric at the last hop node to exclude the channel load due to the AP-client link traffic time.

In at least one embodiment, the mesh path selection logic 116 can be implemented on a client basis to select the alternative channel for the mesh link other than the client's current channel if the end-to-end client throughput is greater than when the mesh link of the same channel is selected. It should be noted that the mesh path selection logic 116 can select an appropriate band or channel for the mesh traffic within a maximum amount of time (e.g., 5 seconds) with valid data traffic to the client. The mesh path selected should not change with self-traffic. Multiple clients added at different points in time should evaluate the right path based on client transmission loads.

As described herein, the maximum throughput seen for a client connected to a leaf node most of the time is half of the radio capability, even in a multi-radio mesh system, whereas a client connected to a gateway can go up to the maximum radio capability. If client traffic and mesh forwarding traffic for the client device use the same channel, then the airtime is divided between the two, so the maximum throughput drops to half. This is a likely scenario as the mesh and client devices independently try to choose the best channel. Conventionally, at the NTLH node, the metric of the current next hop can increase with its own node-to-node traffic that finally ends in the destination client if both mesh and AP-client are on the same link. This leads to a change of mesh path as the data traffic increases if there are nodes with lesser metrics compared to the increased metric of the current node. As a result, the NTLH node and the client nodes can all be on the same mesh link. Because this mesh link is the same as one or more AP-client links, the throughput is reduced as described herein.

In contrast, the mesh path selection logic 116 can select the best path on the alternative channel (or frequency band) if moving to the alternate channel or band improves end-to-end throughput based on the AP-client channel condition and transmission rates. The mesh path selection logic 116 can select the best next hop selection to the destination client (mesh portal (mpp)) in a path based on a destination client and mesh link metric. An example of improving end-to-end peak performance in a multi-band mesh network is illustrated in FIG. 2.

Figure 2:
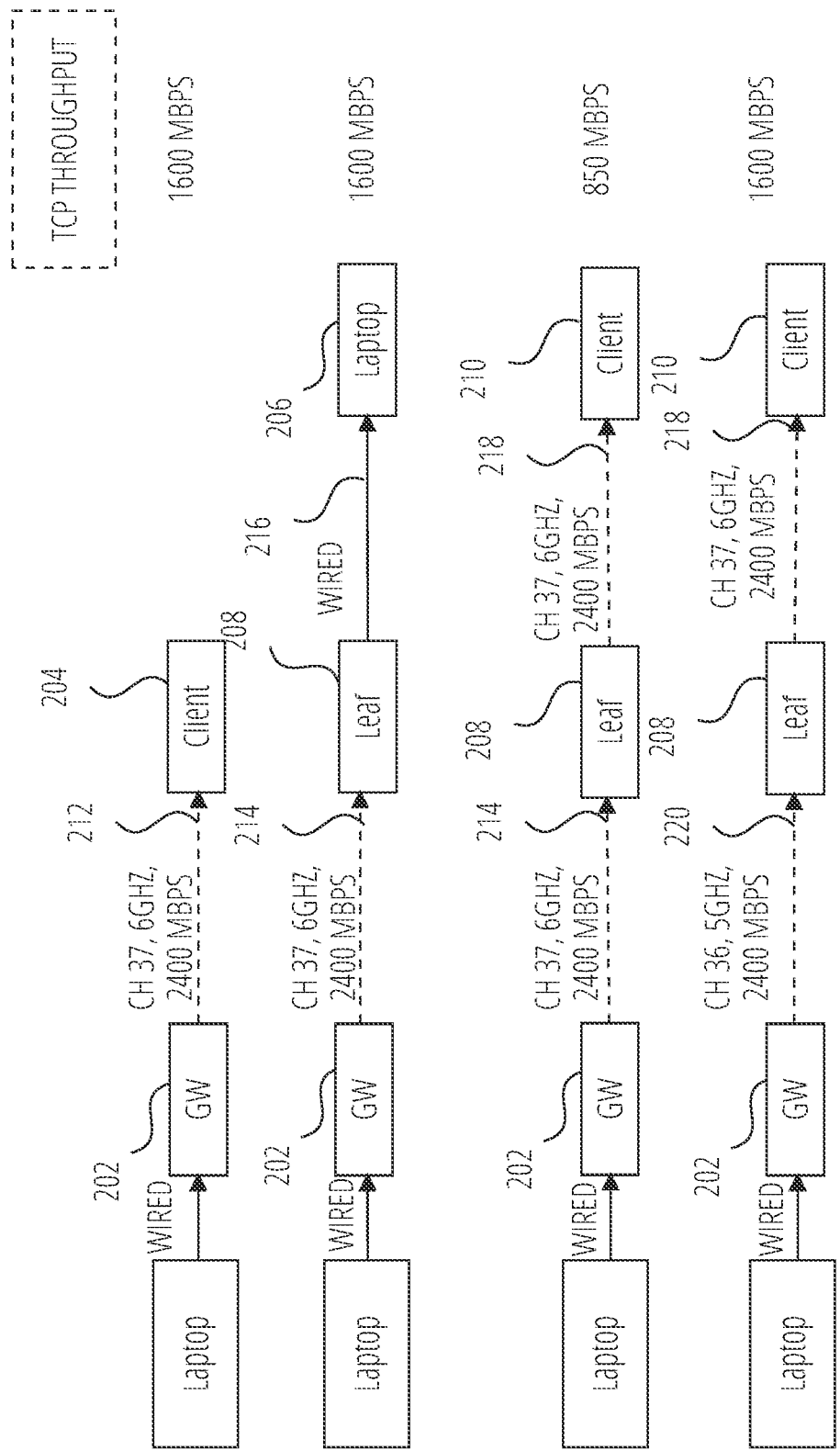
FIG. 2 illustrates four examples of end-to-end throughput scenarios according to various embodiments.

FIG. 2 illustrates four examples of end-to-end throughput scenarios according to various embodiments. In these examples, it is assumed that the environment is absolutely clean with no external traffic interference. In a first scenario, a gateway 202 communicates with a wireless client 204 over an AP-client link 212. For the AP-client link 212, the gateway 202 communicates on channel 37 in the 6 GHz frequency band at a physical (PHY) bitrate of 2400 megabits per second (Mbps). In this scenario, the end-to-end throughput is 1600 Mbps.

In a second scenario, the gateway 202 communicates with a wired client 206 using a leaf node 208. In this second scenario, the gateway 202 is the NTLH node, and the leaf node 208 is the LH node with respect to the wired client 206. In this second scenario, the leaf node 208 is connected to the gateway 202 using a mesh link 214, and the wired client 206 is connected to the leaf node 208 using a wired AP-client link 216. For the mesh link 214, the gateway 202 communicates on channel 37 in the 6 GHz frequency band at a PHY bitrate of 2400 Mbps. The leaf node 208 communicates over the wired connection to the wired client 206. In this scenario, the end-to-end throughput is 1600 Mbps.

In a third scenario, the gateway 202 communicates with a wireless client 210 using the leaf node 208. In this third scenario, the gateway 202 is the NTLH node, and the leaf node 208 is the LH node with respect to the wireless client 210. In this third scenario, the leaf node 208 is connected to the gateway 202 using the mesh link 214, and the wireless client 210 is connected to the leaf node 208 using a wireless AP-client link 218. For the mesh link 214, the gateway 202 communicates on channel 37 in the 6 GHz frequency band at a PHY bitrate of 2400 Mbps. The leaf node 208 also communicates on channel 37 in the 6 GHz frequency band at a PHY bitrate of 2400 Mbps. In this scenario, the end-to-end throughput is 850 Mbps. As described herein, the maximum throughput for the wireless client 210 connected to leaf node 208 is almost half of the radio capability compared to the wireless client 204 connected to the gateway 202, which can go up to the maximum radio capability. If client traffic and mesh forwarding traffic for the wireless client 210 uses the same channel, then the airtime is divided between the two, so maximum throughput drops to half even if the PHY bitrate remains at a higher MCS. This is a more likely scenario as mesh and client devices independently try to choose the best channel.

In a fourth scenario, the gateway 202 can use the mesh path selection logic 116 to select the best path to the wireless client 210. The mesh path selection logic 116 can determine an effective metric of a first path, including mesh link 214 and wireless AP-client link 218, which results in a throughput of 850 Mbps. The mesh path selection logic 116 can determine an effective metric of a second path, including mesh links 220 and 218, which results in a throughput of 1600 Mbps. In particular, the gateway 202 communicates with the wireless client 210 using the leaf node 208 on a different frequency band or channel than the wireless AP-client link 218. In this fourth scenario, the gateway 202 is the NTLH node, and the leaf node 208 is the LH node with respect to the wireless client 210. In this fourth scenario, the leaf node 208 is connected to the gateway 202 using the mesh link 220, and the wireless client 210 is connected to the leaf node 208 using the wireless AP-client link 218. For the mesh link 220, the gateway 202 communicates on channel 36 in the 5 GHz frequency band at a PHY bitrate of 1400 Mbps. The leaf node 208 communicates on channel 37 in the 6 GHz frequency band at a PHY bitrate of 2400 Mbps. In this scenario, the end-to-end throughput is 1600 Mbps.

In comparison, a gateway using a conventional selection algorithm would have selected channel 37, instead of channel 36 since the physical bitrate of channel 37 is higher than channel 36. The conventional selection algorithm does not consider the airtime needed to be consumed for AP-client transmission. By selecting the same frequency band/channel as the AP-client link, the airtime needed is the sum of mesh link transmission and the AP-client transmission. Hence the peak realized is less than half the radio capability. In the fourth scenario, the mesh path selection logic 116 considers the airtime required for the AP-client transmission on the wireless AP-client link 218 with the airtime required for the mesh transmission on the mesh link 220. Hence, the mesh path selection logic 116 can find that channel 36, 5 GHz, even if at a lower PHY bitrate, has less airtime required than using the channel 37, 6 GHz.

In another embodiment, the gateway 202 can communicate on the mesh link 220 on channel 149, 6 GHz, at 2400 Mbps. If the leaf node 208 communicates with the wireless client 210 using the same channel 149 on the AP-client link 212, the throughput is approximately 850 Mbps. However, if the leaf node 208 communicates with the wireless client 210 using channel 36, 5 GHz, at 2400 Mbps on the AP-client link 212, the throughput is approximately 1600 Mbps.

As described herein, the mesh path selection logic 116 can ensure the mesh link traffic does not switch with its self-traffic load variation. The traditional mesh algorithms' metric evaluation is only based on a transmit load generated by its data traffic at its mesh link but does not have a way to account for the transmit load due to the same data traffic at the AP-client link. A transmit load is the amount of airtime consumed by a transmitter from a particular device. So, a transmit load of a mesh device is the amount of airtime consumed by the mesh device to transmit data over a mesh link. A transmit load of a client device is the amount of airtime consumed by the client device to transmit data over an AP-Client link. As a result, as the traffic load increases, the transmit load at the AP-Client link shows as the medium being consumed by other devices outside of the network. The traditional mesh algorithm evaluates the mesh link as having less medium available, and the metric increases. With the increased metric due to its own data traffic, if the other mesh link has a lower metric, the mesh node switches from transmitting data on the one mesh link at a first band to another mesh link at a different band. Similarly, the mesh node would switch back to the first band as the traffic load decreases. Based on the client load, this behavior can cause the mesh node to switch back and forth between the mesh links unnecessarily for transmitting mesh traffic.

In one implementation, the mesh path selection can compute the following metric calculations:

net_bitrate=bitrate*% of medium available tx_time=TEST_FRAME_LEN/bitrate.

metric or tx_time=tx_time*(100−per)/100

The mesh path selection can use the amount of available medium. The medium might have been occupied already by other wireless devices already, so there may be some percentage available for mesh transmission (e.g., 20% medium is free). So, initially when the link metric is estimated it would show some finite number say 10. If the mesh path selection algorithm finds the link better and transmits and occupies the rest 20%, the hardware would sense 0% available and the metric, if estimated, would become very large (e.g., infinite). So, to keep the metric consistent, the metric is an estimate of how much airtime is available for transmission in the standard mesh calculation. The medium available is the radio sense medium available plus the medium occupied by self-traffic (transmit load). But there can be issues with this calculation. In at least one embodiment, the mesh path selection logic 116 can use the traffic load of the mesh link and the traffic load of the AP-client link. The mesh link medium available can be the radio sensed medium available plus the transmit load at the gateway node for the traffic destined to the client plus transmit load at the leaf node for the traffic sent to the client device (e.g., Mesh link Medium Available=Radio Sensed Medium Available+Transmit Load at GW node for the traffic destined to client+Transmit Load at Leaf node for the traffic sent to the client device), instead of the radio sensed medium available plus whole radio transmit load (as done conventionally).

Figure 3:
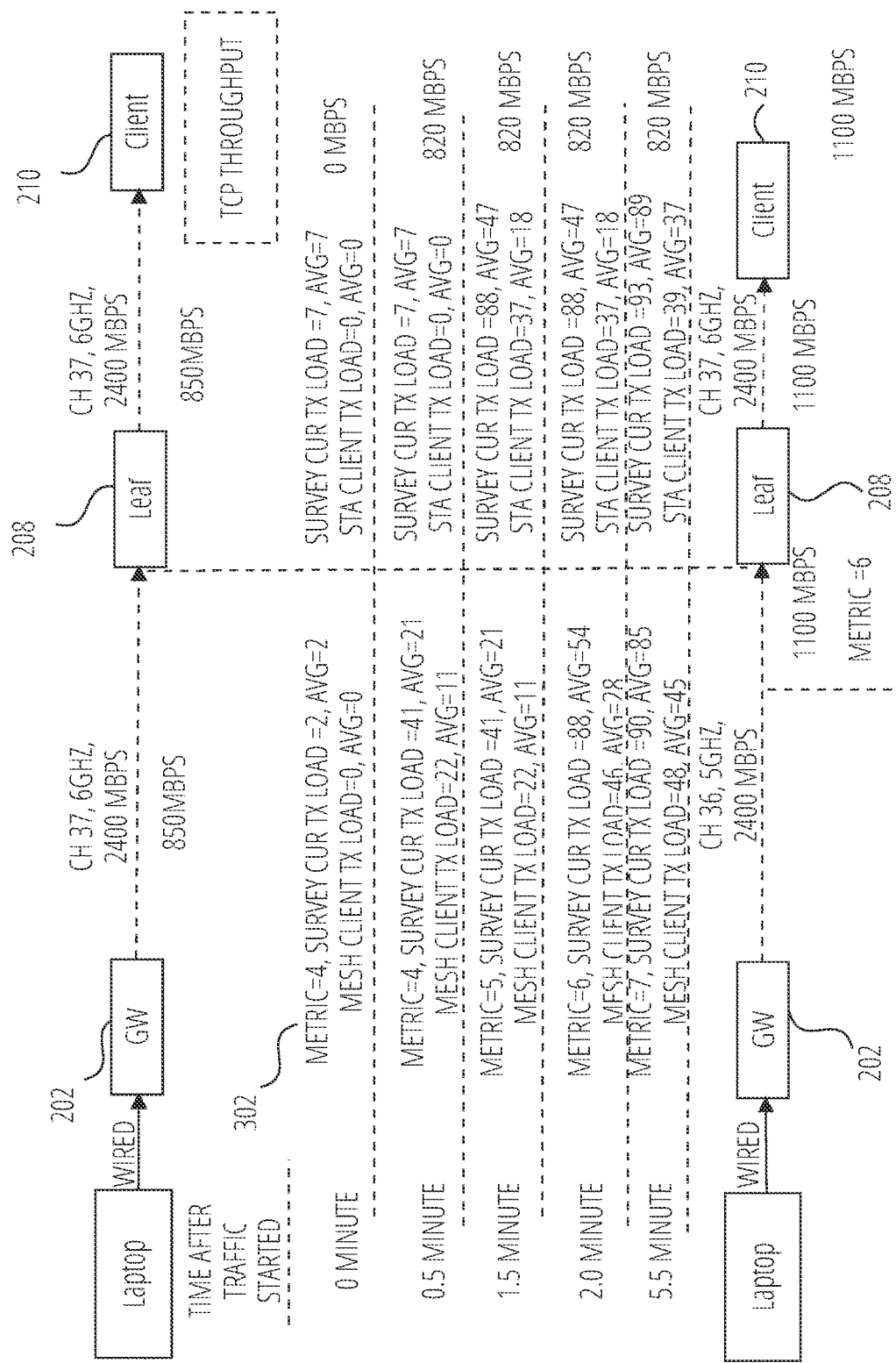
FIG. 3 illustrates an example of transmit load increasing without switching mesh links according to at least one embodiment.

FIG. 3 illustrates an example of transmit load increasing without switching mesh links according to at least one embodiment. As illustrated in FIG. 3, at the NTLH node (gateway 202), the metric 302 of the current next hop increases with its own node-to-node traffic destined to the destination client if both mesh and AP-client are on the same channel/frequency band (e.g., Channel 37, 6 GHz, 2400 Mbps). This leads to a change of mesh path as the data traffic increases if there are nodes with lesser metrics compared to the increased metric of the current node. The channel load can take approximately 4-5 minutes to affect the running channel load average of the mesh link. After around 4-5 minutes, all mesh link traffic could be moved to a better channel, but it is too late to realize the better peak performance. Although the metric calculation by a conventional NTLH can omit the traffic load due to its self-mesh link traffic, the transmission load by the client device is not known at the conventional NTLH node. However, this problem can be resolved using the mesh path selection logic 116. The mesh path selection logic 116, while evaluating the mesh link metric, considers the transmit load at the AP-client link, so the metric 302 remains consistent with or without data traffic, and there is no back-and-forth switching between mesh links.

In general, traditional mesh algorithms determine the best path between two nodes. Once the best path is selected, all traffic between the two nodes flows through the same mesh path for all wireless and wired clients. Even if the chosen best link is completely occupied by the traffic, it cannot split transmissions onto the next better mesh link, so peak throughput is limited to the capability of the best link. The mesh path selection logic 116 is based on the AP-client link and mesh link based, instead of solely depending on the mesh link characteristics. The airtime metric evaluation by the mesh path selection logic 116 considers the traffic load due to other clients in the same mesh link as external traffic load, so if more data flows through the mesh link, it can realize less available medium for transmission. Thus, the airtime metric for the client shows higher, and, as a whole, the effective metric of the other mesh link metric for the client is better than it switches only traffic destined for the client to other mesh links.

The mesh path selection logic 116 can improve the correctness of airtime mesh metric evaluation. A mesh node radio is used for both mesh link and access point on the same mesh node. If there is a heavy transmit load due to its access point traffic and the medium is not available, then moving to an alternate mesh link provides better mesh performance. While evaluating airtime metrics for the mesh links for path selection, traditional mesh algorithms do not distinguish the traffic load due to access point and traffic load due to mesh link. It considers the whole radio transmission load. So, when the selection algorithm tries to evaluate how many channels are available for its own mesh link transmission, the selection algorithm omits the channel transmission load for the whole radio instead of the transmission load of its mesh link. This provides incorrect channel availability results for the mesh link metric, and it wrongly finds the channel is free and selects the same link as the best path, as illustrated in FIG. 4.

Figure 4:
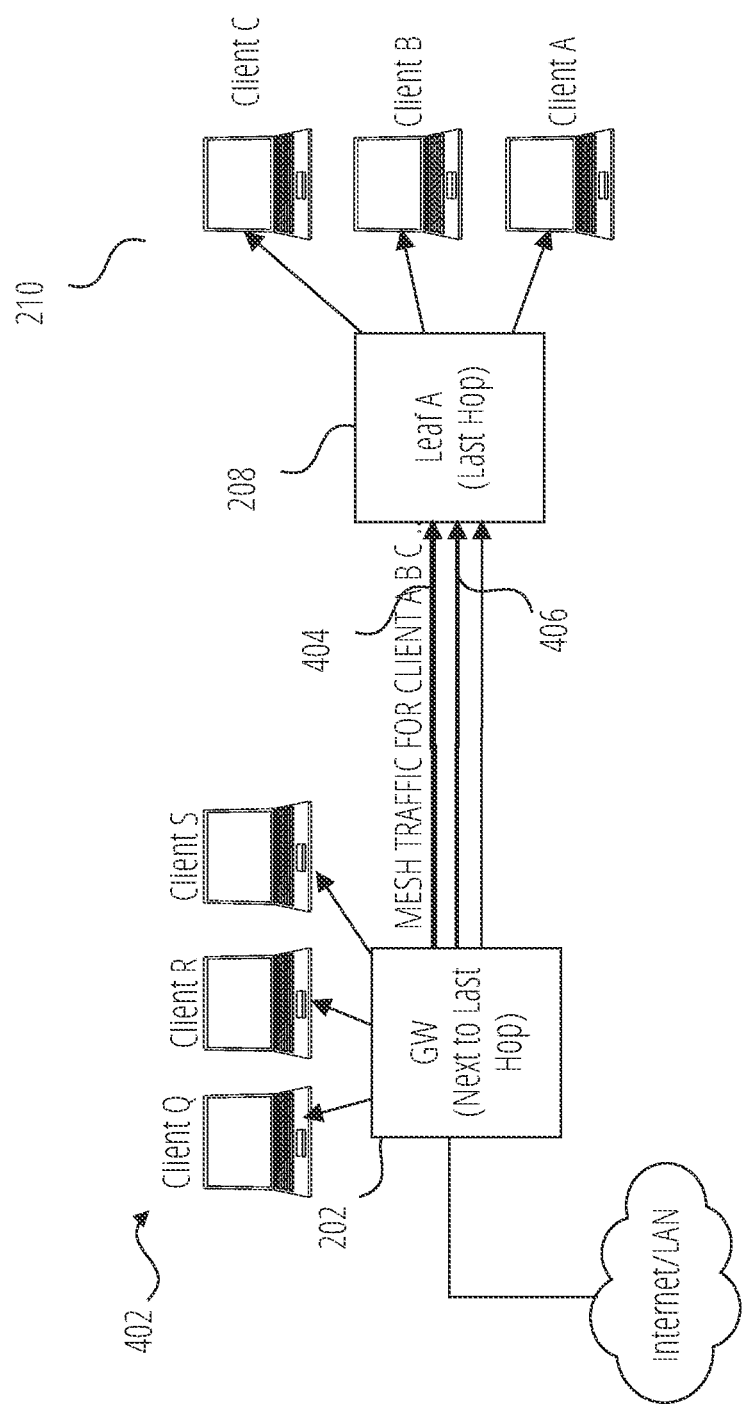
FIG. 4 illustrates an example where multiple clients are connected to a gateway according to at least one embodiment.

FIG. 4 illustrates an example where multiple clients are connected to a gateway according to at least one embodiment. A gateway 202 can be connected to the leaf node 208 with multiple mesh links. The leaf node 208 can be connected to one or more wireless clients, such as wireless client 210. One or more wireless clients 402 (Q, R, S) can be connected to the gateway 202. Consider the traffic due to three wireless clients 402 Q, R, S has completely occupied 95%, and there is no other traffic load even if the 6 GHz mesh link 404 is at the highest bit rate of 2400 Mbps, the leaf node 208 can barely transmit a maximum 120 Mbps to the wireless client 210. But as the metric calculation by a conventional selection algorithm does not consider the same and omits the channel load, the conventional selection algorithm finds 100% channel is available, and the metric shows up as an acceptable level (e.g., 4) compared to other link metrics, which are capable of providing higher bitrates (e.g., 1200 Mbps).

In contrast, the mesh path selection logic 116 considers the transmit load due to only mesh link transmission so that it can find the channel is busy for 95%, causing the metric to be much higher. As a result, the mesh path selection logic 116 selects the next better link, such as mesh link 406. Additional details of the mesh path selection logic 116 are described below with respect to FIG. 5.

Figure 5:
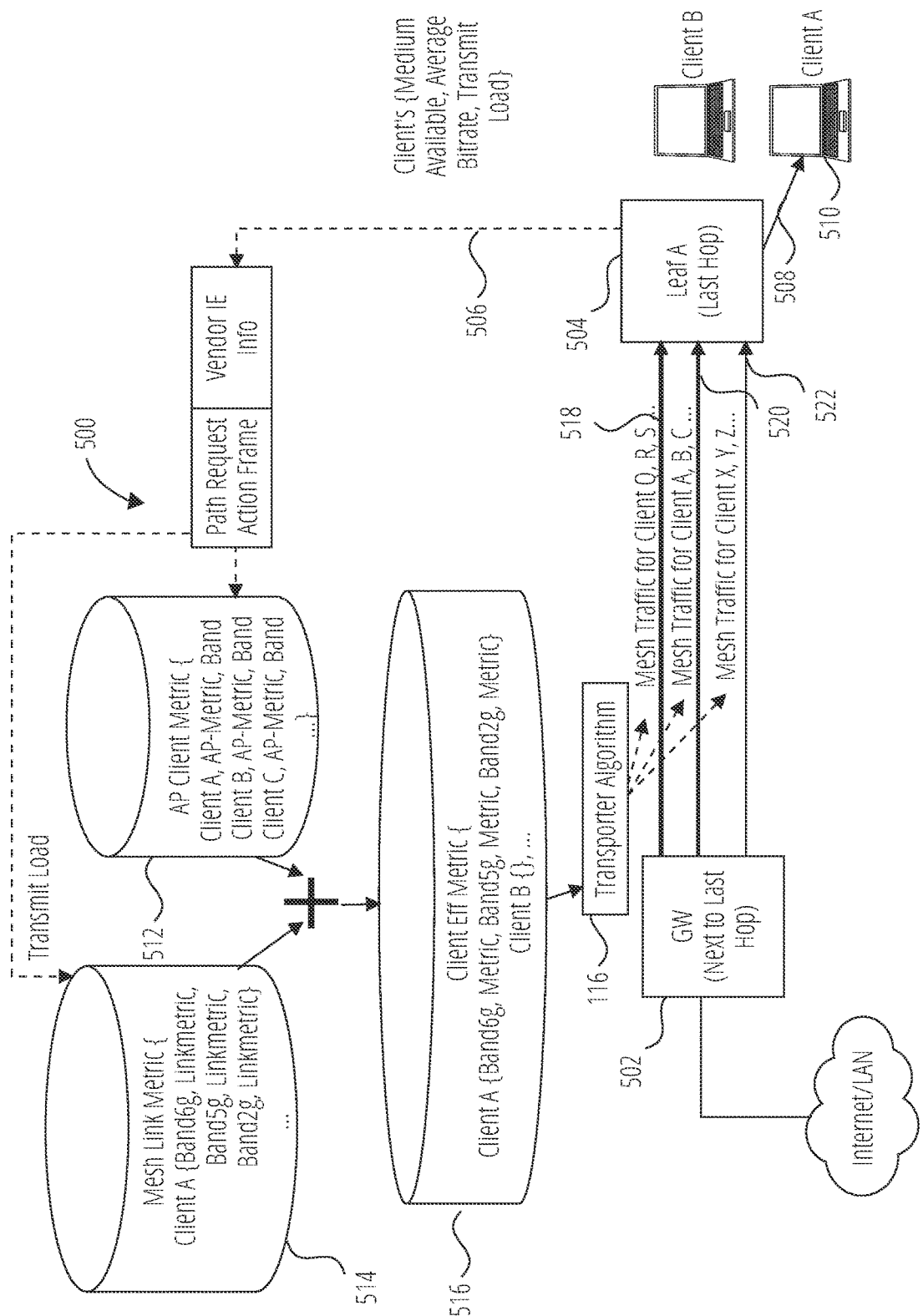
FIG. 5 is a block diagram of a first wireless mesh node with a feedback mechanism from neighbor nodes for mesh path selection according to at least one embodiment.

FIG. 5 is a block diagram of a first wireless mesh node 502 with a feedback mechanism 500 from neighbor nodes for mesh path selection according to at least one embodiment. The first wireless mesh node 502 implements the mesh path selection logic 116. The mesh path selection logic 116 uses the feedback mechanism 500 to obtain client information from each neighbor node. As illustrated in FIG. 5, a second wireless mesh node 504 sends client information 506 to the first wireless mesh node 502. In at least one embodiment, the second wireless mesh node 504 sends a broadcast message with the client information 506. The broadcast message can be sent in an informational element (IE) of a path request action frame. In other embodiments, the client information 506 can be sent in other data or management frames. The client information 506 can include information about an amount of available medium associated with an AP-client link 508 between the second wireless mesh node 504 and a wireless client device 510, an average bitrate associated with the first AP-client link 508, a packet error rate (PER) associated with the first AP-client link 508, a transmit load associated with the first AP-client link 508, or the like. The amount of available medium is the total amount of time less the amount consumed by devices inside and outside of the wireless mesh network. The client information 506 can include a MAC address (e.g., macaddr), a mesh destination address (e.g., meshda), the bitrate, a band number, a PER, a TX load, and a medium available metric. The client information 506 can be used to evaluate an airtime metric of the wireless client device 510. In some embodiments, the client information 506 can be broadcasted to all nodes by appending the information as a "vendor IE" on the standard 802.11s mesh broadcast path request Action frame message. In other embodiments, the client information 506 can be sent via a unicast frame.

In some cases, broadcast messages go at a rate of 6-24 Mbps which can consume some airtime, whereas a unicast message, as it goes at a higher rate, would consume less airtime. A unicast message can take less time, but if there are more neighbor nodes, say 5-6, it would need to duplicate the packet to all nodes. Assuming the mesh nodes provide a higher peak, for example, greater than 500 Mbps, sending five unicast packets is better than a broadcast packet. There may be cases where the mesh nodes that are farther from the node may incur multiple retries, so it may send ten packets in the worst case compared to a single broadcast packet at a lower rate as there is no retry for broadcast. In at least one embodiment, the unicast is sent for when there are lower than eight mesh nodes, whereas a broadcast message is sent when equal to or greater than eight. The cutoff could be other numbers of mesh nodes in the wireless mesh network.

In at least one embodiment, all nodes create a client database with the information and evaluate various metrics, including an airtime metric for AP-client link transmission, client mesh link metric, and client end-to-end effective metric. As illustrated in FIG. 5, the first wireless mesh node 502 receives the client information 506 from the second wireless mesh node 504. The first wireless mesh node 502 creates a first data store 512 to store a first metric (labeled as "AP client metric") for each wireless client device. The first metric can be determined based on the client information 506. The first data store 512 stores a client identifier, a corresponding first metric for the identified client, and a channel or frequency band identifier. For example, if the second wireless mesh node 504 is connected to three wireless clients, the first data store 512 would store three entries, one entry for each wireless client. A second data store 514 can store a second metric ("Mesh Link metric") for each mesh link between the first wireless mesh node 502 and the second wireless mesh node 504. For example, the first wireless mesh node 502 can communicate with the second wireless mesh node 504 over three mesh links, including a first mesh link 518, a second mesh link 520, or a third mesh link 522. The first wireless mesh node 502 can communicate over the first mesh link 518 using a first channel of the 6 GHz frequency band. The first wireless mesh node 502 can communicate over the second mesh link 520 using a second channel of the 5 GHz frequency band. The first wireless mesh node 502 can communicate over the third mesh link 522 using a third channel of the 2.4 GHz frequency band. The second data store 514 can store a mesh link metric (second metric) for each of the three channels. The mesh link metric can factor in the transmit load of the mesh link and the transmit load of an AP-client link. The transmit load of the AP-client link can be shared by the second wireless mesh node 504 in the client information 506. A third data store 516 can store a third metric (labeled as "client effective metric" or "end-to-end effective metric") for each mesh link between the first wireless mesh node 502 and the second wireless mesh node 504. The third metric can be determined using the first metric and the second metric for each channel for each wireless client device. The mesh path selection logic 116 can use the third metric for mesh path selection as described herein.

It should be noted that the client mesh link metric can differ from conventional mesh metrics in that the conventional mesh metric for a link considers all client transmission load as self-transmission load, whereas, for the client mesh link metric, the part of mesh link transmission contributed due to the traffic destined to the client is considered to be the self-transmission load. The transmission load due to the traffic in the mesh link is considered an external transmission load and is treated as not available for the current client transmission. The client effective end-to-end metric for the client in a mesh link is the sum of the airtime link metric (first metric) of AP-client link transmission and client mesh link metric (second metric) if both the client and mesh link are operating on the same band (in-band). If the mesh link and client operate on different bands then (out-band), then the client's effective end-to-end metric (third metric) is the same as the client's mesh link metric (second metric). The mesh path selection logic 116 can select the lowest client effective metric and store the mesh link, creating a new client-based best path database.

For example, in a scenario where the AP client metric is 4, operating at 6 GHz, with an expected standalone peak of 1600 Mbps, the mesh link metric for the first mesh link 518 (6 GHz link) is 4, MCS 11, with an expected standalone peak 1600 Mbps (2×2, 160 Mhz), and the mesh link metric for the second mesh link 520 (5 GHz link) is 6, MCS 8, with an expected standalone peak 1200 Mbps (2×2, 160 MHz), The traditional mesh path algorithms would select the first mesh link 518 (6 GHz mesh link) for mesh link transmission due to the lowest metric (4<6), but the achieved peak would be less than 700 Mbps even in a shielded environment. The mesh path selection logic 116 would select the second mesh link 520 (5 GHz mesh link) as the client effective mesh metric in the first mesh link 518 (6 GHz mesh link) is 8 (4+4=8), which is higher than the effective mesh metric in the second mesh link 520 (5 GHz link) is 6. The expected standalone peak is 1200 Mbps as there is no medium sharing between the second mesh link 520 (5 GHz mesh link) and the 6 GHz AP-client link 508. In the same above example, if the second mesh link 520 (5 GHz mesh link) has a metric of 4 (MCS 11, 1600 Mbps) if the system is capable of handling 3200 processing in software, then the peak throughput realized will be the maximum physical bitrate (e.g., 1600 Mbps).

Figure 6:
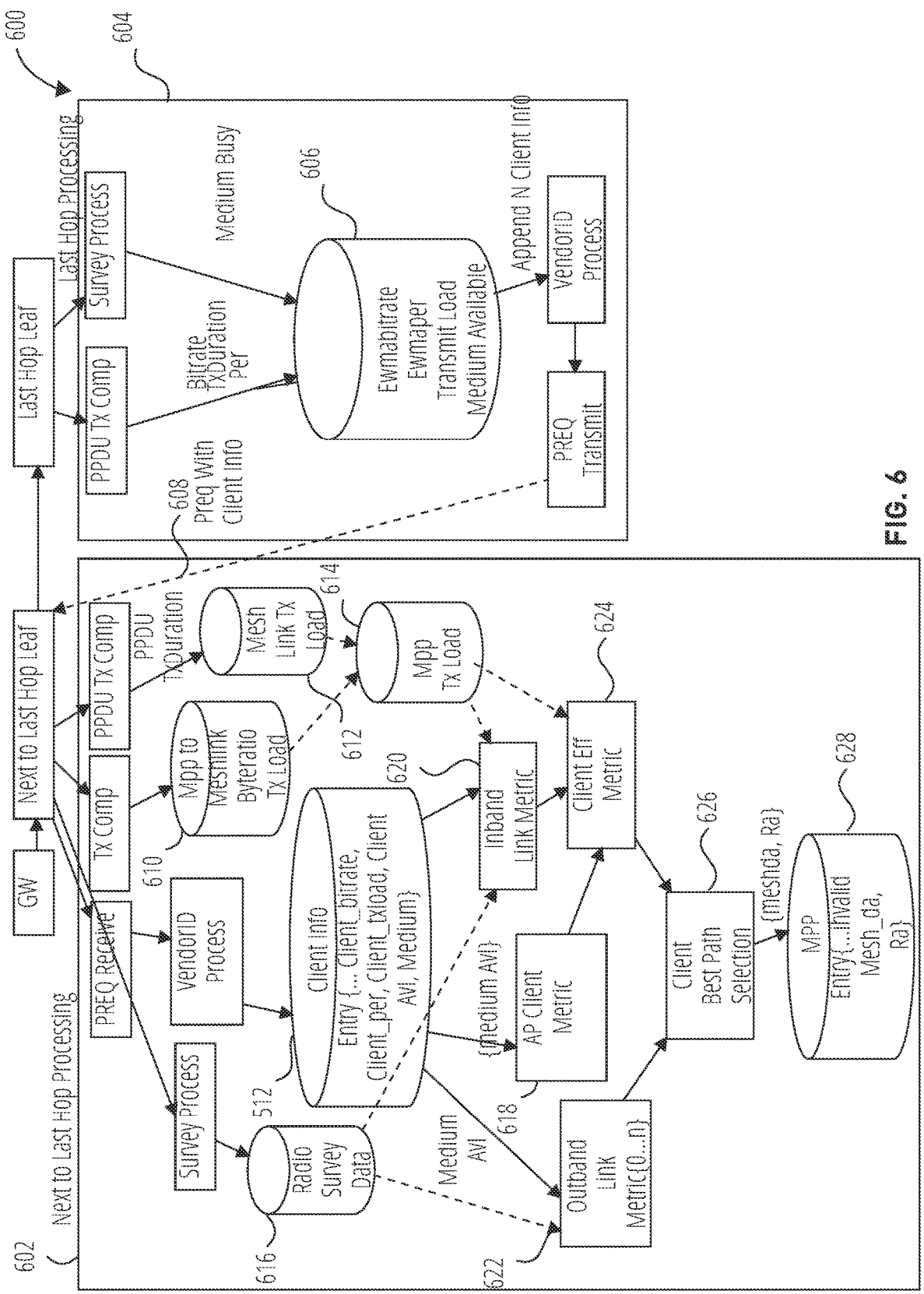
FIG. 6 is a flow diagram of a mesh path selection algorithm for choosing alternate bands for mesh links according to at least one embodiment.

FIG. 6 is a flow diagram of a mesh path selection algorithm 600 for choosing alternate bands for mesh links according to at least one embodiment. The mesh path selection algorithm 600 can be performed by processing logic in an NTLH node 602 and processing logic in an LH node 604. The processing logic can include hardware (e.g., circuitry, dedicated logic, programmable logic, microcode, processing device, etc.), software (such as instructions run on a processing device, a general-purpose computer system, or a dedicated machine), firmware, microcode, or a combination thereof. The mesh path selection algorithm 600 can be implemented by first wireless mesh node 102 and second wireless mesh node 104 of FIG. 1. The mesh path selection algorithm 600 can be implemented in gateway 202 and leaf node 208 of FIG. 4. The mesh path selection algorithm 600 can be implemented in first wireless mesh node 502 and second wireless mesh node 504 of FIG. 5.

The processing logic of LH node 604 can generate client information 606 using metrics received from other processes. For example, the processing logic can receive the bitrate, the packet error rate (PER), and a duration of transmission from a transmitter, and can receive an indication of how busy the medium is from a survey process. The processing logic generates and stores the 606 in a first data store. The processing logic can generate a path request (PREQ) 608 with an information element (IE) containing the client information 606. The processing logic can send the PREQ 608, with the client information 606, to the NTLH node 602. The processing logic of the NTLH node 602 can receive the PREQ 608 and process the client information 606 to store the client information 606 in the first data store 512, as described above. The processing logic of the NTLH node 602 can also determine an mpp TX load 614 using a metric 610 and a metric 612. The metric 610 can correspond to the mpp-to-mesh link byte ratio, and the metric 612 can correspond to a mesh link TX load. The processing logic of the NTLH node 602 can generate medium availability information 616. For example, medium availability information 616 may include a percentage of airtime available on the medium. The percentage can be reduced when other devices that are not part of the network are communicating on the medium (e.g., 2.4 GHz band). The processing logic of the NTLH node 602 can generate an AP-client link metric 618, the second metric 620 ("Mesh Link metric") in the second data store 514 in FIG. 5 (labeled as in-band link metric), an out-band link metric 622, and a client effective metric 624. The client effective metric 624 is the third metric store in the third data store 516 in FIG. 5. The processing logic of the NTLH node 602 can make a best path selection 626 based on the out-band link metric 622 and the client effective metric 624. Once the best path selection 626 is made, it can be stored in a path selection data store 628.

In some embodiments, when selecting an alternate band for the mesh link than used for the client to gain higher end-to-end throughput, the processing logic can decrease the survey time interval (e.g., 60 seconds to 5 seconds). The processing logic can double the metric value when comparing the same channel with another mesh link that is not the same channel as the client. The processing logic can compute an equivalent metric for the AP-client link and add that to the metric reported for that client. The processing logic can consider the AP-client link metric, and the average transmit duration of a client in the mesh metric for the same channel.

There are two major challenges in appropriately calculating the effective airtime link metric at the NTLH node for a client. The conventional mesh metric between the NTLH node and the next hop node does not show the effective metric when traffic is run to the client on the same channel as of mesh link. For example, the metric may indicate it is a clean channel with a channel load of zero and a higher bit rate of 2400 Mbps, which comes down to 880 Mbps when the peak runs to a wireless client. But whereas in the same channel condition/metric, if the traffic is destined for a wired client, the throughput realized is 1600 Mbps. As described herein, the reason is when mesh and AP-STA clients operate in the same channel, the effective end-to-end airtime is the sum of mesh transmission and AP to client transmission, and hence the effective metric needs to be a sum of AP-STA and mesh-to-mesh metric. The sum of the AP-Client metric and Mesh metric of the same channel can provide the actual effective metric as set forth in the following equation (1):

MPP effective metric=Mesh link metric+AP-Client metric

Using the effective metric, the processing logic can avoid static decisions to move to another channel or write various complex conditional logic.

In at least one embodiment, the AP-client link metric 618 can be calculated using the exponentially weighted moving average (EWMA) average bitrate, EWMA average packet error rate (PER), and medium availability information 616 for the client. The EWMA average bitrate and PER can be calculated for all clients, not only mesh clients. The same can be calculated for all clients of an AP of the NTLH node 602. In at least one embodiment, the processing logic can collect the bitrate, determine the average bit rate, and store all the variables inside a mesh object (sta→mesh). The medium availability information 616 can be the availability of the medium for any client or mesh link, omitting its own transmission load, and the same can be used for the metric calculation. For a client whose current data traffic is via mesh link, the transmission load is not only due to the AP-client link traffic on the current node but also the transmit load due to the traffic destined to the current client in the mesh link of the NTLH node. To have a consistent metric for a client that does not vary based on its own traffic, the medium available information for a client needs to omit the transmit load due to the traffic destined to the client at the mesh link and the AP-client transmit load. If the transmit load due to the traffic at the mesh link for the client is not omitted from medium busy, then the traffic would show up at the current node (where the client is connected) as an external transmit load. As the desired client traffic increases, the transmit load would increase and subsequently increase the calculated metric. The metric increasing with its own traffic load is not an accurate or desired metric. The transmit load due to the traffic destined to the client at the NTLH node information is not available in the current mesh node, so the AP-Client metric cannot be calculated at the current node without this information being sent.

In another approach, instead of sending the AP-Client metric, a node can send all other parameters required to calculate the AP-Client metric, such as EWMA bitrate, EWMA Per, running average transmit load, and running average of medium available. In at least one embodiment, the effective medium availability is calculated using the following equation (2):

$$\text{Eff\_Medium\_avl}_{Client}=\text{SurveyMedium Avl+Transmit Load}_{Ap\text{-}client}+\text{Transmit load}_{CLient\text{-}Meshlink\_Txload} \quad (2),$$

where SurveyMedium Avl is the difference between the Radio Total Survey time—The radio Total Survey Busy, Transmit Load$_{Ap\text{-}client}$ is the Transmit load due to AP-Client traffic at the leaf node, Transmit Load$_{Client\text{-}Meshlink\text{-}Txload}$ is the transmit load due to the traffic at mesh link destined for the client at NTLH node. The survey medium available (SurveyMedium Avl) can be expressed as follows in equation (3)

$$\text{SurveyMedium Avl=Survey Active-Survey busy} \quad (3).$$

With respect to the AP-client TX load (Transmit Load$_{Ap\text{-}client}$), it should be noted that the hardware may not provide channel Tx busy time for a given client. The hardware can provide only the total TX time of the radio, and the software/firmware can calculate the Tx duration for the survey duration and calculate the channel busy for a specific client destination. The PPDU indication from the firmware/software can provide the Tx duration for the PPDU. This can be accumulated until the survey duration, and the busy percentage can be evaluated periodically.

For Transmit Load$_{Client\text{-}Meshlink\text{-}Txload}$, even at the next hop node, i.e., at the mesh link transmitter, the traffic load due to the traffic destined to the client (mpp) at the mesh link itself cannot be calculated as mesh link transmission can include the traffic destined to the client along with other clients sharing the same mesh link. A wireless PPDU at a mesh link can include packets destined for other destinations (clients connected to a leaf/wired client or leaf node terminating traffic), so the transmit duration for the desired traffic cannot be separated out. To identify the traffic load pertaining to a traffic destined to a client connected to the leaf node from PPDU duration, an approximate estimate can be done as expressed in the following equation (4):

Approximate traffic load(destined to the leaf client)= (Running average of Byte ratio of the client with respect to the total mesh link)×(The running average transmit load for mesh link)

In at least one embodiment, the AP-client metric can be calculated as follows in equation (5):

AP client metric=scaling factor/net_bitrate), where net_birate=Effective Channel Avl*EWMA Avg bitrate, where Effective Channel Avl@ap-client=100−(Channel TxBusy %−AP-Client Tx busy %−Mesh-Mpp Tx busy %)     (5).

In at least one embodiment, the scaling factor is 256+(900*(8192<<8)). In at least one embodiment, the meshlink effective metric of a client is the metric for the client's traffic in a mesh link which is quite different from the regular mesh link metric. The mesh link metric represents the capability of the whole mesh link in the current environment. So, while calculating the mesh link metric, the medium available parameter excludes the self-transmission load of the mesh link as a result. For a station in a mesh link, when all other clients are transmitting, the medium available is reduced, so considering the whole mesh link medium available would not be an accurate measure of how much the medium is available for this client. Hence, when calculating the effective mesh link metric for the client, the medium available should include other clients' transmit load too.

With respect to the medium available for clients (mpp) at the mesh link, in the mesh link metric calculation, the medium available is generally excluded the whole Mesh link transmit load, though it also excludes the transmit load of the whole radio capability. But when considering this only for a single client end-to-end metric, the medium available should exclude the transmit load incurred due to the client traffic at the mesh link. This is one of the key differences in how the mesh link metric is calculated with respect to the mesh link metric of an mpp of the mesh link.

In a given physical link, the transmission happens on a single peer for mesh-to-mesh traffic, even though packets are destined for different client destinations. To know the transmit duration of a packet destined to a given mpp, the average byte ratio is calculated and applied to the whole mesh link to estimate the Tx load duration, as expressed in the following equation (6):

$$\text{Medium\_Avl}_{Client\text{-}Mesh\text{-}Link} = \text{Survey\_available} + \text{Transmit load}_{Client\text{-}meshlink} \quad (6)$$

The medium available for radio (Survey_available) can be expressed in the following equation (7):

$$\text{Survey\_Available} = \text{Survey\_Active} - \text{Survey\_Busy} \quad (7)$$

For the transmit load for client traffic in a mesh link (Transmit load$_{Client\text{-}meshlink}$), as described above, there is no feasible way to calculate the transmit load for a given client traffic in a mesh link, so it is an estimate as expressed in the equation (8) below:

$$\text{Transmit load}_{client\text{-}meshlink} = \text{Transmit load}_{Mesh\ link\ peer} \times (\text{MPP bytes/Mesh peer bytes}) \quad (8)$$

In at least one embodiment, the processing logic can calculate a channel load average, such as using equation (9) below:

$$x = (x + \text{newvalue}(y)) >> 1 \quad (9)$$

For the initial state x can start at 0. The running average value at the start would be=y/2, which provides half the value if some algorithm considers it. It takes longer to recover to the actual value even if their values are steady at y. This can be avoided by starting the averaging with a non-zero initial. For example, the running average could be determined using the following pseudocode.

Running average:—
if (!x)
   x=y;
else
   x=(x+y)>>1

In at least one embodiment, the EWMA average bitrate for a client can be calculated, as described above. The first rate used for transmission as pre-rate control is half the max rate supported then, depending on the PER, the rates may go up or low. Consider a scenario where the radio is capable of 2401 Mbps. The first packet sent from the AP is at 1253 Mbps, gradually increasing. As per the actual data collected, it takes around 30 packets to have the rate control to send the packet at 2401 Mbps. This can significantly affect EWMA average rate that has been calculated when the first packet is sent. The EWMA average is initialized to half the max rate supported 1253, and later it does not increase to the max rate (2401 Mbps) even after the adopted maximum rate (2401). It slowly increases to 2401 Mbps even if all the packets are sent at 2401 Mbps. Data collected in a shielded-cable setup takes around 500 packets to be transmitted to see the EWMA average bitrate reach 2401. The 500 packets to reach the actual data rates is too high to estimate the metric of the client and can provide wrong estimates for a longer duration if there are no significant data, e.g., with a 1253 Mbps rate, it may show a metric of 9 compared to the actual metric of 4. If the very initial metric, i.e., 9, is considered, then the wrong decision to move the client to another alternative band is made as the effective in-band link metric 620 (mesh link+client metric) will be much higher due to the initial un-updated half rate consideration in metric.

In at least one embodiment, the processing logic can check if the client is just connected then it does not send the update for a specified number of packets (e.g., a maximum of 50 packets).

In at least one embodiment, the survey clock can be synchronized across the nodes. In at least one embodiment, the mesh survey happens at every 1-minute interval, which calculates various survey parameters such as Survey active, busy, TX busy, TX busy, etc., which is used to determine the transmit load and medium available for the mesh link or client. These parameters in transporter design are shared from one node to another for AP-client metric and effective link metric calculation as described above. Although the transmit load and the medium availability are running averages, they may not change frequently. A one-minute interval can be big enough if any semi-updated number is shared then, for the one-minute duration, it would be taking incomplete data if both the nodes' clocks are not synchronized. Hence synchronization of this timer across the nodes needs to be done for accurate and deterministic metric calculation. In at least one embodiment, the processing logic can synchronize the survey timer to the system clock's minute starting so that the survey is evaluated on every minute of the system clock. A cloud system can synchronize the system clock, so every node evaluates the survey during the system clock's minute ending.

In at least one embodiment, the nodes can avoid sending station updates if there is no significant activity by the station. For example, if there is no change to the EWMA bitrate, there is no change in the EWMA PER, there is a delta change in transmit load that is within a certain percentage (e.g., 2%), and the delta change in medium availability is within a certain percentage (e.g., 2%). This can reduce the number of messages and neighbor updates.

In at least one embodiment, the neighbor client information update can include various channel information and parameters for the best path selection. The channel information and parameters needed for the mesh path selection algorithm 600 can include the client channel information, the AP-client metric information, the AP-client self-channel load percentage, or the like. The client channel information can be needed during client connection, but the AP-client metric information and the AP-client self-channel load percentage are needed at intervals as a channel load survey timer. The information can be shared with the clients, for example, the static client connection information with channel frequency and the dynamic update of client metric and transmit channel load.

The static update to the client channel information can be found to be non-significant as the dynamic update can help with the information after only a few seconds of delay. Also, the static client connection information cannot ensure the available bitrate and hence should not be used for client metric calculation. For the dynamic update of the client metric and transmit channel load percentage, the processing logic can use a roam notifier to update this information periodically and append the client information on existing mesh action frames. For example, when the mesh node is in a proactive root mode (e.g., when dot11MeshHWMPRootMode is either IEEE80211_PROACTIVE_RANN, IEEE80211_PROACTIVE_PREQ WITH_PREP, or IEEE80211_PROACTIVE_PREQ_NO_PREP), a broadcast action frame is sent. These action frames can be extended to have a vendor IE carrying client information. In some modes, all links send the action frame every second. In at least one embodiment, the vendor IE with the information can be appended in the PREQ action frame. The update frequency does not need to be every second, so the Vendor IE element can be added at an interval of a specified amount of time (e.g., 30 seconds). The following is an example action frame parser for the client information 606.

The IEEE 802.11s action frame parser:_ ieee802_11_parse_elems_crc
  #define EERO_OUI 0xdb2214/*eero OUI 14:22:db*/
  ie_len=6;
  *pos++=WLAN_EID_VENDOR_SPECIFIC;
  ptr_ie_len=pos;
  *pos++=ie_len;
  *pos++=(EERO_OUI>>16) & 0xff,
  *pos++=(EERO_OUI>>8) & 0xff,
  *pos++=(EERO_OUI>>0) & 0xff,
  *pos++=EERO_OUI_TYPE_STATION_INFO;
  *pos++=EERO_STATION_INFO_SIZE;
  ptr_stacount=pos;
  *pos++=stacount;

In at least one embodiment, the data structure for each client information can be structured as follows:
  client_metric_info {
  U8 macaddr[6]. —Client mac address
  U8 meshda[6]—Mesh Destination address—Used to identify next to last hop node
  u32 bitrate; —AP client transmission bit rate. —EWMA average
  U8 bandnum; —Client Operating band [0, 1, 2, 3]
  U8 per; —AP client transmission PER—packet error rate
  U8 txload; —Average Transmit load due to AP☐Client traffic
  U8 mediamavl; —Medium available at current node this includes current AP client traffic transmit load
  }

In some cases, the message need not always carry all client information. The granularity to send messages can be programmable. For example, the update for every client should go within a 30-second interval. This could help to reduce the length of the message. For example, if there are 30 clients on a radio, every message can have only one client information, i.e., around 20 bytes.

Figure 7:
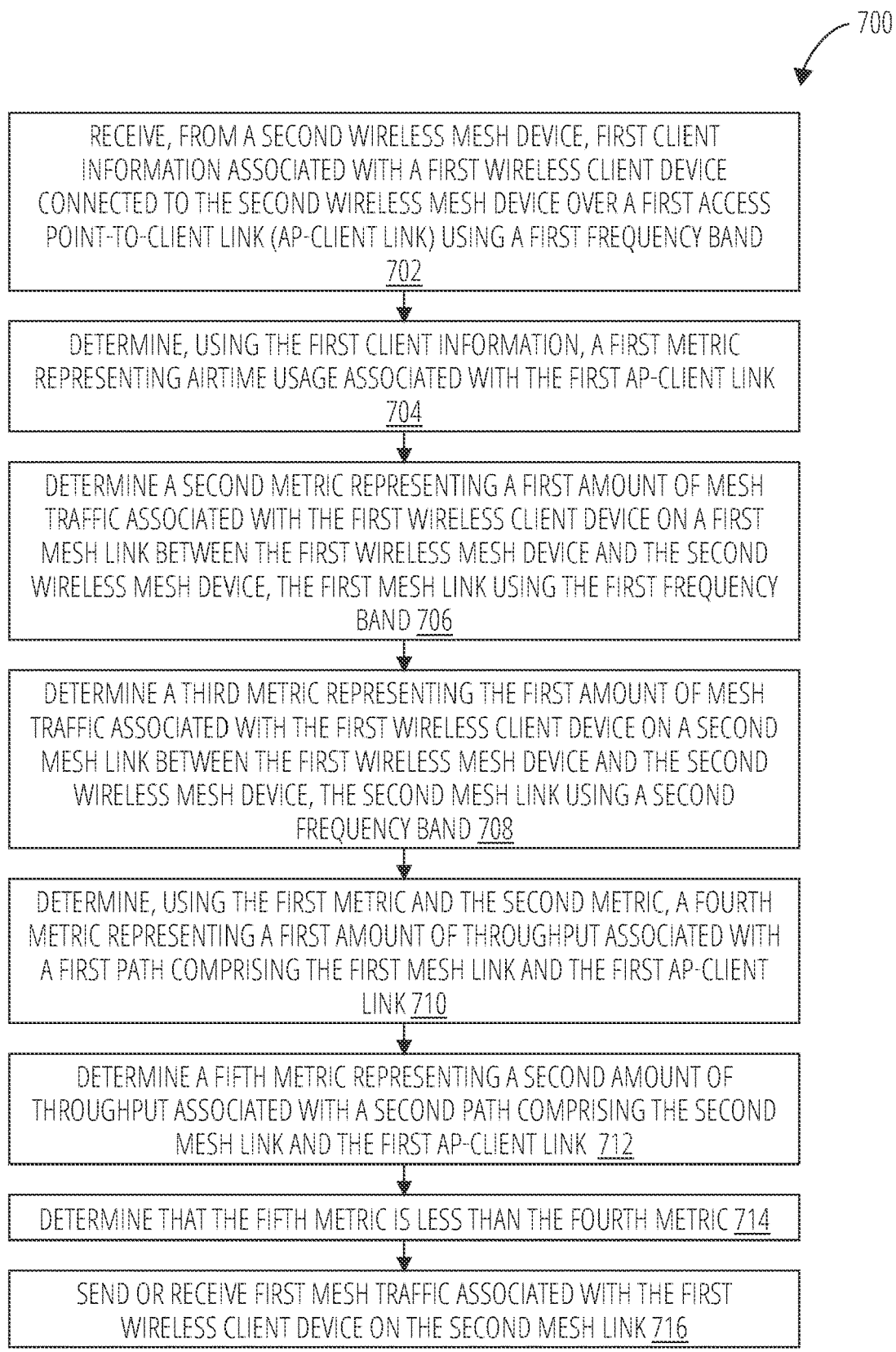
FIG. 7 is a flow diagram of a method for selecting an alternative mesh link based on end-to-end peak performance according to at least one embodiment.

In at least one embodiment, the channel information database (first data store 512) can be formatted as follows:
  struct eero_station_info {
  u8 addr[ETH_ALEN];
  u32 bitrate; /*ewma average bit rate*/
  u8 sta_per; /*ewma average packet error rate*/
  u8 tx_load; /*running average transmission load*/
  u8 medium_avail; /*running average channel available*/
  u8 pad;
  };

FIG. 7 is a flow diagram of a method 700 for selecting an alternative mesh link based on end-to-end peak performance according to at least one embodiment. Method 700 may be performed, at least in part, by processing logic that may include hardware (e.g., circuitry, dedicated logic, programmable logic, microcode, processing device, etc.), software (such as instructions run on a processing device, a general-purpose computer system, or a dedicated machine), firmware, microcode, or a combination thereof. The method 700 can be performed by the first wireless mesh node 102 of FIG. 1. The method 700 can be performed by the gateway 202. The method 700 can be performed by the first wireless mesh node 502 of FIG. 5. The method 700 can be performed by the NTLH node 602 of FIG. 6.

The method 700 begins with the processing logic of a first wireless mesh node receiving, from a second wireless mesh device, first client information associated with a first wireless client device connected to the second wireless mesh device over a first link (e.g., AP-client link) using a first frequency band (block 702). In at least one embodiment, the first client information includes an amount of available medium (e.g., the amount of available medium described above with respect to FIGS. 1 and 5, and the medium availability information 616 described above) associated with the first link, an average bitrate associated with the first link, a packet error rate (PER) associated with the first link, and a transmit load associated with the first link. The average bitrate is also described herein as the physical bitrate information provided in the client information 506. The transmit load (also referred to herein as self-transmit load information) is also described herein as the transmit load on an AP-client link, where the self-transmit load information associated with the first link is provided by in the client information 506 described above. The transmit load can also referred to the transmit load on a mesh link, where the self-transmit load information is associated with a mesh link and can be determined by the mesh node. At block 704, the processing logic determines, using the first client information, a first metric representing airtime usage associated with the first link. At block 706, the processing logic determines a second metric representing a first amount of data associated with the first wireless client device to be transmitted on a second link between the first wireless mesh device and the second wireless mesh device, the second link using the first frequency band. At block 708, the processing logic determines a third metric representing the first amount of data associated with the first wireless client device to be transmitted on a third link between the first wireless mesh device and the second wireless mesh device, the third link using a second frequency band. At block 710, the processing logic determines, using the first metric and the second metric, a fourth metric representing a first amount of throughput associated with a first path, including the second link and the first link. The fourth metric can be an end-to-end throughput metric. At block 712, the processing logic determines a fifth metric representing a second amount of throughput associated with a second path, including the third link and the first link. At block 714, the processing logic determines that the fifth metric is less than the fourth metric. At block 716, the processing logic sends or receives first data associated with the first wireless client device on the third link.

The following describes a scenario where processing logic does not cause data to be transmitted on the alternative path but continues to transmit the data on the mesh link already being used. In a further embodiment, the processing logic receives, from the second wireless mesh device, second client information associated with a second wireless client device connected to the second wireless mesh device over a fourth link (e.g., second AP-client link) using a third frequency band. For example, a second client device (client B) sends an action frame with the second client's information, similar to the first client information 506 described above with respect to FIG. 5. Using the second client information, the processing logic determines a sixth metric representing airtime usage associated with the fourth link. The processing logic determines a seventh metric representing a second amount of data associated with the second wireless client device to be transmitted on a fifth link between the first wireless mesh device and the second wireless mesh device, the fifth link using the third frequency band. The processing logic determines an eighth metric representing the second amount of data associated with the second wireless client device to be transmitted on the second link or the third link. The processing logic determines, using the sixth metric and the seventh metric, a ninth metric representing a third amount of throughput associated with a third path, including the fifth link and the fourth link. The processing logic determines a tenth metric representing a fourth amount of throughput associated with a fourth path, including (i) the second link and the fourth link or (ii) the third link and the fourth link. The processing logic determines that the tenth metric is not less than the ninth metric. The processing logic sends or receives second data associated with the second wireless client device to be transmitted on the fourth path. The first and second wireless client devices are on different frequency bands in this case. As described herein, the first and second wireless client devices can be on the same frequency band. When the first and second wireless client devices are on the same frequency band, the client effective metrics will be based on the AP-client metrics from the respective devices.

The following describes how the first metric (e.g., airtime usage) is determined for an AP-client link. In at least one embodiment, the processing logic receives a message (e.g., broadcast or unicast message) from the second wireless mesh device. The message includes the first client information and a second client information associated with a second wireless client device connected to the second wireless mesh device over a fourth link using the first frequency band. Based on the first client information, the processing logic determines a first airtime metric associated with the first wireless client device. Based on the second client information, the processing logic determines a second airtime metric associated with the second wireless client device. The processing logic determines the first metric using the first and second airtime metrics. In a further embodiment, the processing logic determines a sixth metric representing a second amount of data associated with a second wireless client device on the second link, the second wireless client device being connected to the second wireless mesh device over a fourth link. The processing logic determines, using the first metric and the sixth metric, a seventh metric representing a third amount of throughput associated with a third path comprising the second link and the fourth link. The processing logic determines an eighth metric representing a fourth amount of throughput associated with a fourth path comprising the third link and the fourth link. The processing logic determines that the eighth metric is less than the seventh metric. The processing logic sends or receives second data associated with the second wireless client device to be transmitted on the third link.

The following describes when the first wireless mesh device and the wireless client are both on the first frequency band, and the first wireless mesh device switches because of airtime usage. In at least one embodiment, the processing logic receives, from the second wireless mesh device, third client information associated with the first wireless client device connected to the second wireless mesh device over the first link using the first frequency band. Using the third client information, the processing logic determines a sixth metric representing a second airtime usage associated with the first link. The processing logic determines a seventh metric representing a third amount of data associated with the first wireless client device to be transmitted on the second link. The processing logic determines, using the sixth metric and the seventh metric, an eighth metric representing a third amount of throughput associated with the first path comprising the second link and the first link. The processing logic determines a ninth metric representing a fourth amount of throughput associated with the second path comprising the third link and the first link. The processing logic determines that the ninth metric is less than eighth metric. The processing logic sends or receives second data associated with the first wireless client device to be transmitted on the third link. In some cases, a leaf node can send an update of airtime metrics, and the first wireless mesh device does not switch. In other cases, the first wireless mesh device switches to an alternate channel/frequency band based on the updated airtime metrics.

In a further embodiment, the processing logic receives, from the second wireless mesh device, third client information associated with the first wireless client device connected to the second wireless mesh device over the first link using the first frequency band. Using the third client information, the processing logic determines a sixth metric representing a second airtime usage associated with the first link. The processing logic determines a seventh metric representing a third amount of data associated with the first wireless client device to be transmitted on the second link. The processing logic determines, using the sixth metric and the seventh metric, an eighth metric representing a third amount of throughput associated with the first path comprising the second link and the first link. The processing logic determines a ninth metric representing a fourth amount of throughput associated with the second path comprising the third link and the first link. The processing logic determines that the ninth metric is not less than eighth metric. The processing logic sends or receives second data associated with the first wireless client device to be transmitted on the second link.

Figure 8:
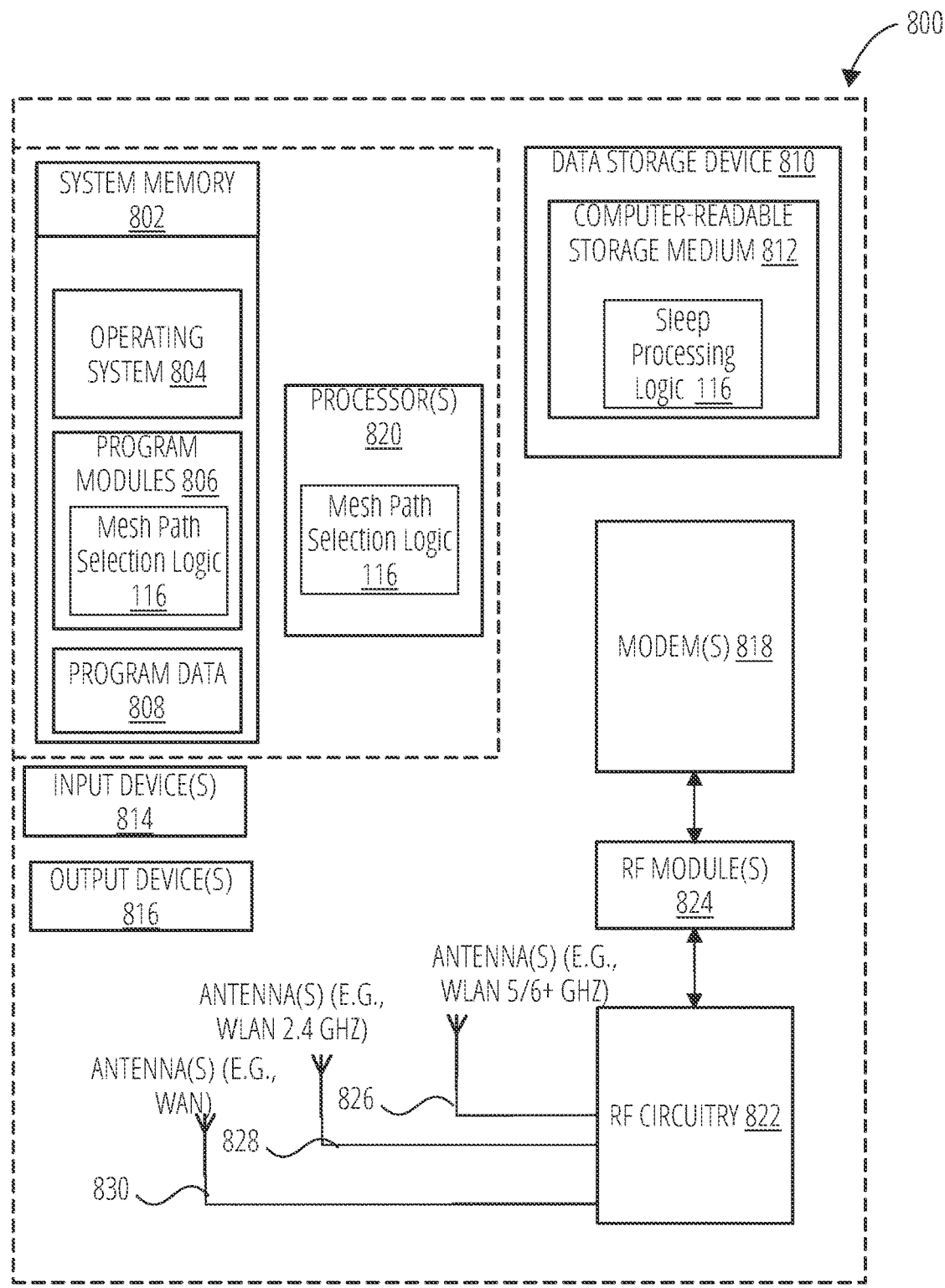
FIG. 8 is a block diagram of an electronic device with mesh path selection logic, according to at least one embodiment of the present disclosure.

FIG. 8 is a block diagram of an electronic device 800 with mesh path selection logic 116, according to at least one embodiment of the present disclosure. The electronic device 800 may correspond to the user devices described herein. The electronic device 800 includes one or more processor(s) 820, such as one or more central processing units (CPUs), microcontrollers, field-programmable gate arrays, or other types of processors. The electronic device 800 also includes system memory 802, which may correspond to any combination of volatile and/or non-volatile storage mechanisms.

The system memory 802 stores information that provides operating system component 804, various program modules 806, program data 808, and/or other components. The program modules 806 may include instructions for the mesh path selection logic 116. The mesh path selection logic 116 can perform any of the operations described herein. In one embodiment, the system memory 802 stores instructions of methods to control the operation of the electronic device 800. The electronic device 800 performs functions using the processor(s) 820 to execute instructions provided by the system memory 802.

The electronic device 800 also includes a data storage device 810 that may be composed of one or more types of removable storage and/or one or more types of non-removable storage. The data storage device 810 includes a computer-readable storage medium 812 on which is stored one or more sets of instructions embodying any of the methodologies or functions described herein. Instructions for the program modules 806 may reside, completely or at least partially, within the computer-readable storage medium 812, system memory 802, and/or within the processor(s) 820 during execution thereof by the electronic device 800, the system memory 802, and the processor(s) 820 also constituting computer-readable media. The electronic device 800 may also include one or more input device(s) 814 (keyboard, mouse device, specialized selection keys, etc.) and one or more output device(s) 816 (displays, printers, audio output mechanisms, etc.).

The electronic device 800 further includes a modem(s) 818 to allow the electronic device 800 to communicate via wireless connections (e.g., provided by the wireless communication system) with other computing devices, such as remote computers, an item-providing system, and so forth. The modem(s) 818 can be connected to one or more radio frequency (RF) modules 824. The RF modules 824 may be a WLAN module, a WAN module, a personal area network (PAN) module, a GPS module, or the like. The antenna structures (antenna(s) 826, 828, and 830) are coupled to the RF circuitry 822, which is coupled to the modem(s) 818. The RF circuitry 822 may include radio front-end circuitry, antenna switching circuitry, impedance matching circuitry, or the like. In one embodiment, the RF circuitry 822 includes the radio frequency front-end (RFFE) circuitry with high selectivity performance as described in the various embodiments of FIG. 9 to FIG. 24. The antennas antenna 826 may be GPS antennas, NFC antennas, other WAN antennas, WLAN or PAN antennas, or the like. The modem(s) 818 allows the electronic device 800 to handle both voice and non-voice communications (such as communications for text messages, multimedia messages, media downloads, web browsing, etc.) with a wireless communication system. The modem(s) 818 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 818 may generate signals and send these signals to antenna(s) 826 of a first type (e.g., WLAN 5/6+ GHz), antenna(s) 828 of a second type (e.g., WLAN 2.4 GHz), and/or antenna(s) 830 of a third type (e.g., WAN), via RF circuitry 822, and Rf module(s) 824 as described herein. Antennas 826, 828, 830 may be configured to transmit in different frequency bands and/or using different wireless communication protocols. The antennas 826, 828, 830 may be directional, omnidirectional, or non-directional antennas. In addition to sending data, antennas 826, 828, 830 may also receive data, which is sent to appropriate RF modules connected to the antennas. One of the antennas 826, 828, 830 may be any combination of the antenna structures described herein.

In one embodiment, the electronic device 800 establishes a first connection using a first wireless communication protocol and a second connection using a different wireless communication protocol. The first wireless connection and second wireless connection may be active concurrently, for example, if an electronic device is receiving a media item from another electronic device via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band. The second wireless connection is associated with a second resonant mode of the antenna structure that operates at a second frequency band. In another embodiment, the first wireless connection is associated with a first antenna structure, and the second wireless connection is associated with a second antenna.

Though a modem 818 is shown to control transmission and reception via antenna (826, 828, 830), the electronic device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of operating a first wireless device, the method comprising:
   determining a first metric representing airtime usage associated with a first link between a second wireless device and a third wireless device;
   determining, using the first metric, a second metric representing a first amount of throughput associated with a first path comprising the first link and a second link between the first wireless device and the second wireless device, the second link using a first frequency range;
   determining a third metric representing a second amount of throughput associated with a second path comprising the first link and a third link between the first wireless device and the second wireless device, the third link using a second frequency range;
   determining that the third metric is less than the second metric; and
   sending or receiving first data associated with the third wireless device on the third link.

2. The method of claim 1, wherein the first link uses the first frequency range.

3. The method of claim 1, further comprising:
   receiving, from the second wireless device, first information associated with the third wireless device, wherein the first metric is determined using the first information.

4. The method of claim 3, wherein the first information comprises at least one of: an amount of available medium associated with the first link, an average bitrate associated with the first link, or a transmit load associated with the first link.

5. The method of claim 1, further comprising:
   determining a fourth metric representing a first amount of data associated with the third wireless device if transmitted on the second link; and
   determining a fifth metric representing the first amount of data associated with the third wireless device if transmitted on the third link, wherein the second metric is determined using the first metric and the fourth metric and wherein the third metric is determined using the first metric and the fifth metric.

6. The method of claim 1, further comprising:
   receiving, from the second wireless device, second information associated with a fourth wireless device coupled to the second wireless device over a fourth link, the fourth link using a third frequency range;
   determining, using the second information, a fourth metric representing airtime usage associated with the fourth link;
   determining, using at least the fourth metric, a fifth metric representing a third amount of throughput associated with a third path comprising the fourth link and a fifth link between the first wireless device and the second wireless device, the fifth link using the third frequency range;
   determining a sixth metric representing a fourth amount of throughput associated with a fourth path comprising (i) the second link and the fourth link or (ii) the third link and the fourth link;
   determining that the sixth metric is not less than the fifth metric; and
   sending or receiving second data associated with the fourth wireless device on the fourth path.

7. The method of claim 1, further comprising:
   receiving a message from the second wireless device, the message comprising first information associated with the third wireless device and second information associated with a fourth wireless device coupled to the second wireless device over a fourth link using, the fourth link the first frequency range;
   determining a first airtime metric associated with the third wireless device based on the first information;
   determining a second airtime metric associated with the fourth wireless device based on the second information; and
   determining the first metric using the first airtime metric and the second airtime metric.

8. A first wireless device in a wireless network, the first wireless device comprising:
   a multi-band radio;
   a processor coupled to the multi-band radio; and
   memory to store computer-executable instructions that, if executed, cause the processor to:
     determine a first metric representing airtime usage associated with a first link between a second wireless device and a third wireless device;
     determine, using the first metric, a second metric representing a first amount of throughput associated with a first path comprising the first link and a second link between the first wireless device and the second wireless device, the second link using a first frequency range;

determine a third metric representing a second amount of throughput associated with a second path comprising the first link and a third link between the first wireless device and the second wireless device, the third link using a second frequency range;

determine that the third metric is less than the second metric; and send or receive first data associated with the third wireless device on the third link.

9. The first wireless device of claim 8, wherein the first link uses the first frequency range.

10. The first wireless device of claim 8, the processor further to:

receive, from the second wireless device, first information associated with the third wireless device, wherein the first metric is determined using the first information.

11. The first wireless device of claim 10, wherein the first information comprises at least one of: an amount of available medium associated with the first link, an average bitrate associated with the first link, or a transmit load associated with the first link.

12. The first wireless device of claim 8, the processor further to:

determine a fourth metric representing a first amount of data associated with the third wireless device if transmitted on the second link; and determine a fifth metric representing the first amount of data associated with the third wireless device if transmitted on the third link, wherein the second metric is determined using the first metric and the fourth metric, and wherein the third metric is determined using the first metric and the fifth metric.

13. The first wireless device of claim 8, the processor further to:

receive, from the second wireless device, second information associated with a fourth wireless device coupled to the second wireless device over a fourth link, the fourth link using a third frequency range; and determine, using the second information, a fourth metric representing airtime usage associated with the fourth link.

14. The first wireless device of claim 8, wherein the processor further to:

receive a message from the second wireless device, the message comprising first information associated with the third wireless device and second information associated with a fourth wireless device coupled to the second wireless device over a fourth link, the fourth link using the first frequency range;

determine a first airtime metric associated with the third wireless device based on the first information;

determine a second airtime metric associated with the fourth wireless device based on the second information; and determine the first metric using the first airtime metric and the second airtime metric.

15. A wireless network comprising:

a first wireless device; and a second wireless device, wherein the first wireless device performs operations comprising:

determining a first metric representing airtime usage associated with a first link between a second wireless device and a third wireless device;

determining, using the first metric, a second metric representing a first amount of throughput associated with a first path comprising the first link and a second link between the first wireless device and the second wireless device, the second link using a first frequency range;

determining a third metric representing a second amount of throughput associated with a second path comprising the first link and a third link between the first wireless device and the second wireless device, the third link using a second frequency range;

determining that the third metric is less than the second metric; and sending or receiving first data associated with the third wireless device on the third link.

16. The wireless network of claim 15, wherein the first link uses the first frequency range.

17. The wireless network of claim 15, the operations further comprising:

receiving, from the second wireless device, first information associated with the third wireless device, wherein the first metric is determined using the first information.

18. The wireless network of claim 17, wherein the first information comprises at least one of: an amount of available medium associated with the first link, an average bitrate associated with the first link, or a transmit load associated with the first link.

19. The wireless network of claim 15, the operations further comprising:

determining a fourth metric representing a first amount of data associated with the third wireless device if transmitted on the second link; and determining a fifth metric representing the first amount of data associated with the third wireless device if transmitted on the third link, wherein the second metric is determined using the first metric and the fourth metric, and wherein the third metric is determined using the first metric and the fifth metric.

20. The wireless network of claim 15, the operations further comprising:

receiving, from the second wireless device, second information associated with a fourth wireless device coupled to the second wireless device over a fourth link, the fourth link using a third frequency range;

determining, using the second information, a fourth metric representing airtime usage associated with the fourth link;

determining, using at least the fourth metric, a fifth metric representing a third amount of throughput associated with a third path comprising the fourth link and a fifth link between the first wireless device and the second wireless device, the fifth link using the third frequency range;

determining a sixth metric representing a fourth amount of throughput associated with a fourth path comprising (i) the second link and the fourth link or (ii) the third link and the fourth link;

determining that the sixth metric is not less than the fifth metric; and sending or receiving second data associated with the fourth wireless device on the fourth path.

* * * * *